US007698115B2

(12) United States Patent
Voellm et al.

(10) Patent No.: US 7,698,115 B2
(45) Date of Patent: Apr. 13, 2010

(54) SYSTEM AND METHOD FOR DYNAMICALLY ALLOCATING RESOURCES IN A CLIENT/SERVER ENVIRONMENT

(75) Inventors: Anthony F. Voellm, Redmond, WA (US); Ahmed H. Mohamed, Sammamish, WA (US); David M. Kruse, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1026 days.

(21) Appl. No.: 10/611,437

(22) Filed: Jun. 30, 2003

(65) Prior Publication Data

US 2004/0267932 A1    Dec. 30, 2004

(51) Int. Cl.
*G06G 7/48* (2006.01)
(52) U.S. Cl. .......................................... 703/6; 709/203
(58) Field of Classification Search .................... 703/1, 703/6; 709/226, 203
See application file for complete search history.

(56) References Cited

U.S. PATENT DOCUMENTS

| 6,078,960 | A  | * | 6/2000 | Ballard ........................ 709/229 |
| 6,230,200 | B1 | * | 5/2001 | Forecast et al. ............. 709/226 |
| 6,856,619 | B1 | * | 2/2005 | Haugseth et al. ............ 370/389 |

OTHER PUBLICATIONS

Kui Gao et al.; "Real-Time Scheduling and On-Line Resource Allocation on Scalable Streaming Media Server"; Visual Communications and Image Processing 2003; Proceedings of SPIE vol. 5150pp. 544-551.
Sajed Husein et al.; "A Priority Based Service Algorithm for Use in Time-Critical and Integrated Services Networks"; Sep. 6-11, 2003, Proceeding s of IEEE Singapore International Conference on Networks/International Conference on Information Engineering '93; pp. 93-97.
R. Levy et al; "Performance Management for Cluster Based Web Services"; Mar. 24-28, 2003; IFIP/IEEE Eighth International Symposium on Integrated Network Management (IM 2003), Colorado Springs; pp. 247-261.
Zonghua Gu et al.; "Algorithms for Effective Variable Bit Rate Traffic Smoothing"; Apr. 9-11, 2003; Conference Proceedings of the 2003 IEEE International Performance, Computing, and Communications Conference; pp. 387-394.
Zihui Ge et al; "A Demand Adaptive and Locality Aware (DALA) Streaming Media Server Cluster Architecture"; May 12-14, 2002; Proceedings of the 12th International Workshop on Network and Operating Systems Support for Digital Audio and Video; pp. 139-146.

* cited by examiner

*Primary Examiner*—Kamini S Shah
*Assistant Examiner*—Saif A Alhija
(74) *Attorney, Agent, or Firm*—Merchant & Gould, P.C.

(57) ABSTRACT

Described is a mechanism for dynamically allocating receive buffers on a server to a plurality of clients in a network environment. The server maintains a list of the number of transaction credits in use by each client, the number of transaction credits allocated to each client, and the number of pending transaction requests that are not being handled due to a limitation on the number of allocated transaction credits. The transaction credits correspond to the receive buffers. In a resource constrained situation, the server computes an equitable distribution of the available credits and reallocates the available credits based on that equitable distribution.

24 Claims, 6 Drawing Sheets

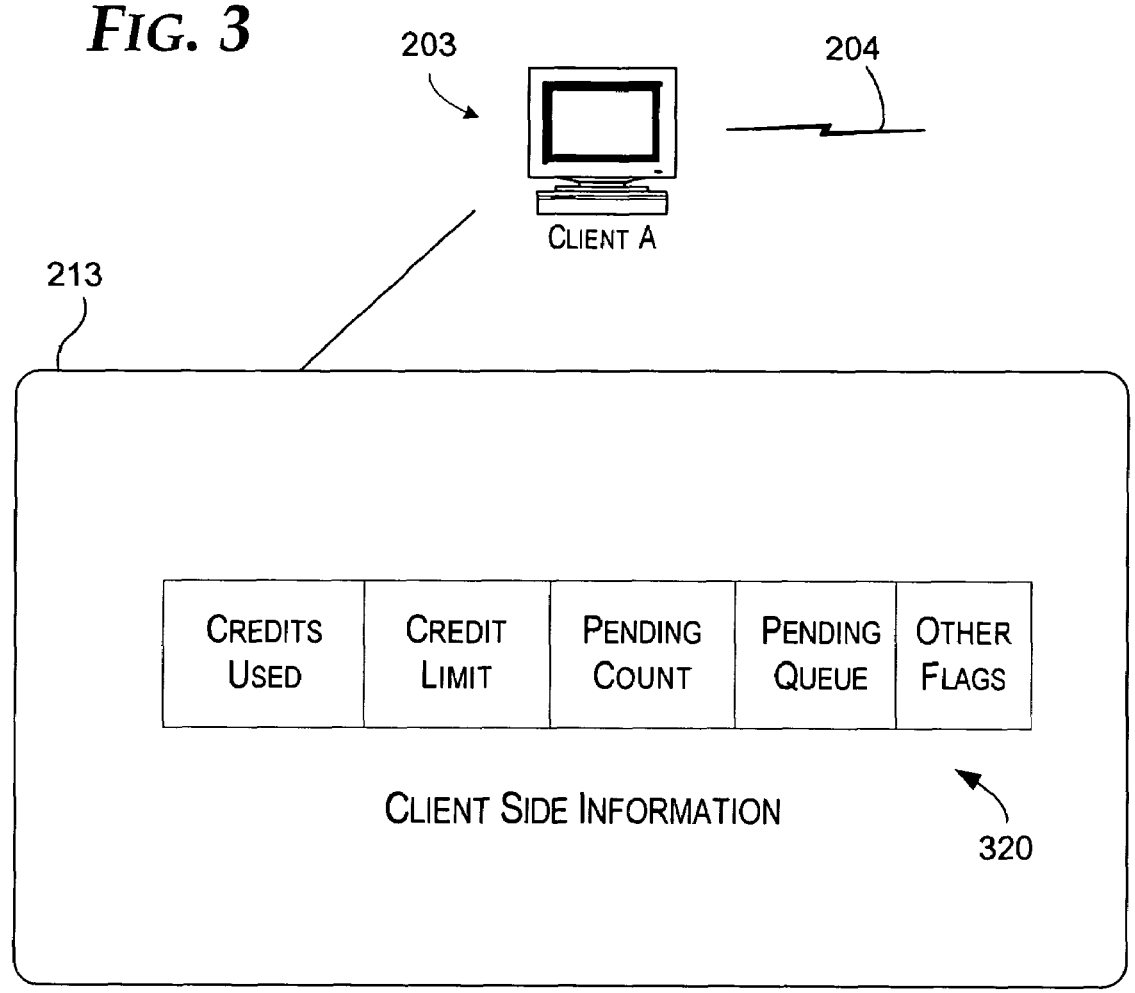

FIG. 4

Negotiate initial minimum credit allocation called the Credit Limit

```
While (forever) {
    Wait for a new request, completion or credit message

If (new request) {
        If (Current Used Credits < Credit Limit) {
            Update Current Used Credits by +1
            Insert number of pending I/O's into the current request
            Send new request to the server
        } else {
            Queue new request to the pending queue
        }
    } else if (completion) {
        Complete I/O
        If (uses posted receives) {
            Repost receive
        }
        If (request pending) {
            Remove request from pending queue and send to the sever.
        } else {
            Update Current Used Credits by -1
        }
    } else /* credit message */ {
        if (plus N credit message) {
            if (uses posted receives) {
                Repost receive
            }
            Dequeue and send N pending messages with
                one marked as a credit ack
            Update Current Used Credits by the actual number sent
            Update Credit Limit by N
        } else if (minus N credit message) {
            if (uses posted receives) {
                Repost Receive
            }
            Update Credit Limit by -N
            If (flushing posted receives) {
                Send N credit messages to the sever up to Credit Limit
                Queue unsent credits messages to the pending queue
            }
        }
    } if (uses posted receives) {
      Fr e p sted receive
    }
}
```

403 — (new request block)
407 — (plus N credit message block)
409 — (minus N credit message block)

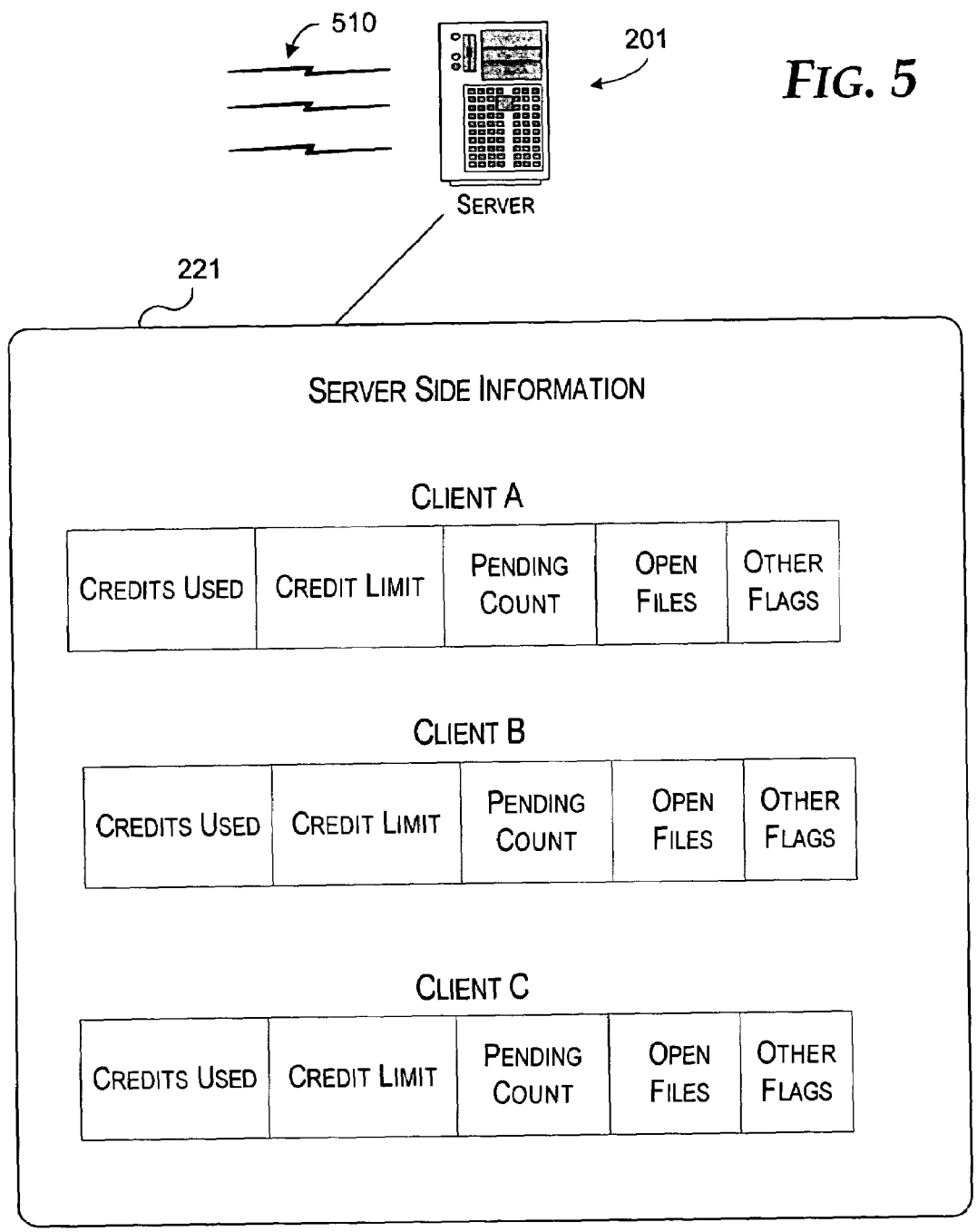

*FIG. 6*

```
/* i is the index for a particular client instance. */
/* i,j is the index for file j on client instance i */
    While (forever) {
        Wait for new client connection or
        new client I/O request or
        credit timer expires or
        credit message
```

603 {
```
        if (new connection) {
            Process Connection Request
            Negotiate minimum credits for the connection
            Accept connection if credits available otherwise reject
            Set Credit Timer if connection accepted.
        } else If (new client I/O request) {
```

605 {
```
            /* CP = Client hint on number Pending requests to be sent */
            If (CP of new request > CPi) then {
                Store CP in CPi
                Set Credit Timer if not already set
            }

Dispatch client I/O request
        } else if (credit message) {
```

607 {
```
            Acknowledge credit message
            If all credits acknowledge then mark connection as acknowledged
        } else if (credit timer expired) {
            Compute; {
                Total Client Connections (TC) = $\sum_i 1$ Total Files open (TF) = $\sum_{i,j} 1$ Total pending requests (TR) = $\sum_i CP_i$ /* CUi is the number of credits in use on connection i */

Total credits used (TU) = $\sum_i CU_i$
            } for each client connection i {
                if (connection i waiting for ack) {
                    do nothing or disconnect if wait time expired
                } else {
                    if ((TU + TR) > MC) {
                        if (be fair to files) {
                            NCLi = MC * CFi/TF
                        } else /* be fair to connections */ {
                            NCL = MC/TC
                        }
                    } else {
                        NCLi = infinite;
                    }
```

609 {
```
                    Adjust NCLi to meet minimum negotiated if (CLi > NCLi) then {
                        Send minus delta credit message of NCi – NCLi
                    } else if (((CLi * Completion Factor) – CUi) > 0) then {
                        Send minus delta credit message of CLi – CUi
                    } else if (CPi > 0) {
                        Send positive delta credit message of
                            min(CPi, NCLi – NCi, MC – TU)
                            increase TU by N and reduce TR by N
                    }
                }
            }
        }
    }
}
```

SYSTEM AND METHOD FOR DYNAMICALLY ALLOCATING RESOURCES IN A CLIENT/SERVER ENVIRONMENT

FIELD OF THE INVENTION

The present invention relates to network computing environments. More particularly, the present invention relates to server resource allocation in a network computing environment.

BACKGROUND OF THE INVENTION

Client/server network environments have become ubiquitous. It is routine today for client computing systems to connect over a network to a server. Competition among network hardware and software providers drives them to offer more and more sophisticated products. One particular feature of network computing systems that is a point of competition is file system performance. Computing system developers strive to provide network servers with robust file system performance.

One limitation on server performance is the physical limitation of available server resources, such as hard disk space, processor power, and available memory. The amount of available memory can be particularly important in situations where multiple clients connect to a server simultaneously, as frequently occurs. More specifically, when multiple clients connect to the server, the server must allocate its resources to each of the clients. One example is receive buffers used to support file system transactions between the clients and the server. Every receive buffer allocated to a particular client consumes a certain amount of memory. In addition, different clients vary in their respective need for available server resources.

When the available resources exceeds the number of resources being requested by all the clients, there should be no noticeable performance impact on any one client because any one client could simple attempt to negotiate more resources. However, as happens with increasing frequency today, sometimes the number of resources being requested by the clients exceeds the available resources. Today, that situation is handled by simply refusing to accept new connections. In other words, once a client has been allocated buffers or other resources, those resources remain allocated until the client releases them.

While this is one solution to the problem, the inventors have determined that this is an inequitable solution because in many cases, clients may have allocated but unused resources. If so, it seems unfair that a particular client with a disproportionate number of allocated server resources can continue to hold those resources to the exclusion of new clients, even if that client isn't making use of them.

An adequate mechanism for allocating server resources to multiple clients in an equitable manner has eluded those skilled in the art.

SUMMARY OF THE INVENTION

The present invention is directed at a mechanism for equitably rebalancing server resources that are allocated to a plurality of clients connected to the server. Briefly stated, a client maintains information about how many transaction credits it has allocated and in use. When issuing a transaction request, the client sends a hint about how many additional resources the client may need to satisfy its current workload. The hint may take the form of a number of pending transaction requests that are currently queued at the client. The server analyzes the client's information about the additional needed resources and compares that information to a number of available resources at the server. The available resources may have been allocated to other clients connected to the server. If sufficient resources exists to satisfy the client's need, then those resources are allocated to the client. If sufficient resources do not exist, the server invokes a rebalancing mechanism to quantify an equitable number of resources that should be allocated to each client connected to the server. The server then issues rebalancing messages to any affected client to either reduce or increase the affected client's credit limit so that each client has an equitable allocation of resources.

BRIEF DESCRIPTION OF THE DRAWINGS

FIG. 3 is a graphical representation of relevant components of a client computing system that stores resource allocation information in accordance with the invention.

FIG. 4 is a pseudo-code representation of an illustrative process performed at the client for interacting with the server to achieve dynamic rebalancing of the client's allocated resources.

FIG. 5 is a functional block diagram generally illustrating a server configured for use in the network environment of FIG. 2.

FIG. 6 is a pseudo-code representation of an illustrative process performed at the server for interacting with the client to achieve dynamic rebalancing of the client's allocated resources.

DETAILED DESCRIPTION OF THE PREFERRED EMBODIMENT

The invention will be described here first with reference to one example of an illustrative computing environment in which embodiments of the invention can be implemented. Next, a detailed example of one specific implementation of the invention will be described. Alternative implementations may also be included with respect to certain details of the specific implementation. It will be appreciated that embodiments of the invention are not limited to those described here.

Illustrative Computing Environment of the Invention

Figure 1:
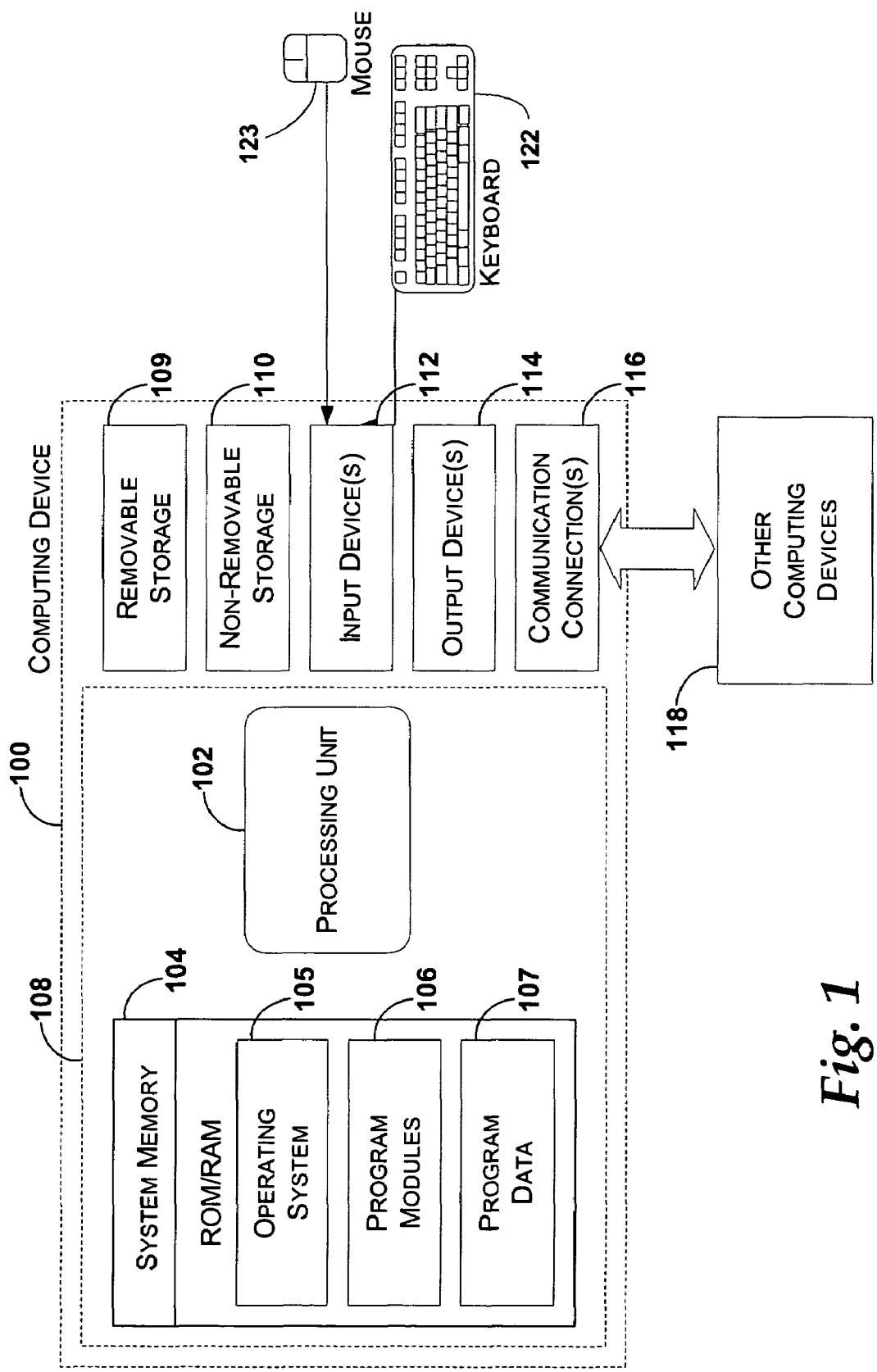
FIG. 1 is a functional block diagram that illustrates a computing device that may be used in implementations of the present invention.

FIG. 1 illustrates a computing device that may be used in illustrative implementations of the present invention. With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration of computing device 100 is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard 122, mouse 123, pen, voice input device, touch input device, scanner, etc. Output device(s) 114 such as a display, speakers, printer, etc. may also be included. These devices are well known in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Discussion of Specific Implementation

Figure 2:
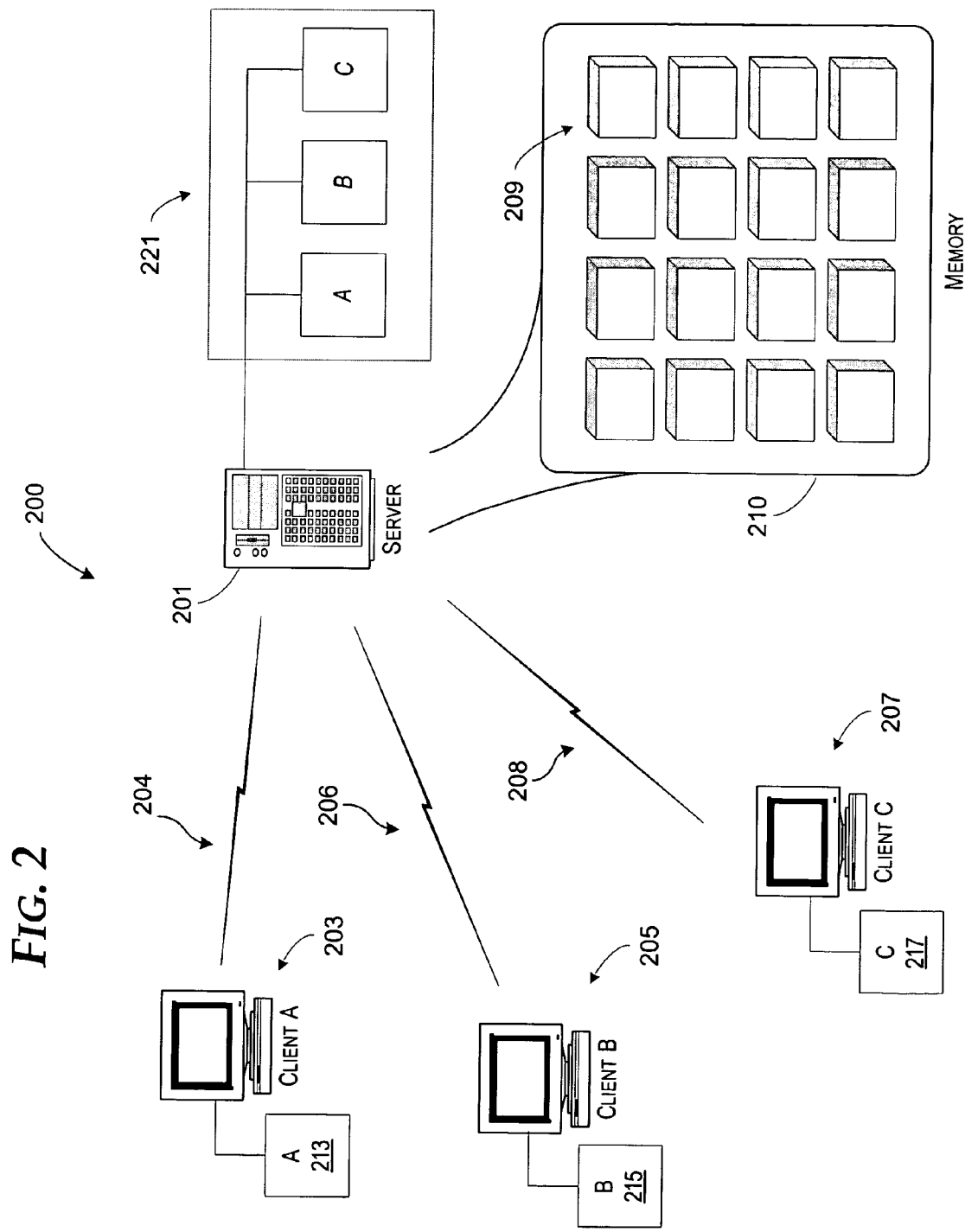
FIG. 2 is a functional block diagram generally illustrating a network environment in which embodiments of the invention may be implemented.

FIG. 2 is a functional block diagram generally illustrating a network environment in which embodiments of the invention may be implemented. As shown in FIG. 2, a network environment 200 includes a server 201 and a plurality of clients (e.g., client 203, 205, 207) connected to a network. Certain aspects of a representative client, such as client 203, are described in detail below in conjunction with FIG. 3. Certain aspects of the server 201 are described in detail below in conjunction with FIG. 4. However, those devices are described here generally regarding the manner in which they interact and their respective roles in this implementation of the invention.

Each client has a connection (e.g., connections 204, 206, 208, respectively) to the server 201. The clients and the server 201 may communicate using one of many different communication protocols. One communication protocol that may be used for distributed file systems is the Light Weight I/O (LWIO) protocol. The LWIO protocol enables an application operating on one computer (i.e., the client 203) to communicate directly with a file system on the server 201 without necessarily involving kernel-mode resources on the client computer. Bypassing kernel-mode operations reduces the overhead associated with distributed file access, resulting in improved performance over other protocols, like TCP/IP. Clients can, however, have both user and kernel level components performing file I/O transactions on the server 201.

When a client, such as client 203, initiates a transaction over the network, the server 201 allocates certain resources to handling the transaction for the particular client. Most notably, the server 201 allocates to the client a certain number of buffers 209 within its available system memory 210. The buffers 209 are used to support I/O transactions from the client to the server 201. Each time another client, such as client 205, makes a connection to the server 201, more of the server's resources are allocated to that new client. However, as noted above, the resources that the server 201 can make available are limited.

For the purpose of this discussion, each resource (e.g., receive buffers 209) that the server 201 allocates to a client is termed a "transaction request credit" or simply a "credit." In accordance with the invention, the number of credits allocated by the server 201 to each client is dynamic, and may be modified over the lifetime of the several connections made by the several clients that connect to the server 201. In addition, for the purpose of this discussion, the term "transaction" includes any access, such as a read or write, of data on the server 201. As will be described in great detail below in conjunction with FIGS. 3-6, the clients and the server 201 each maintain and share information that allows the server 201 to rebalance credit allocation in an equitable fashion that seeks to improve overall system performance. Each client, such as client 203, maintains information (e.g., information 213) about the state of its allocated credits and pending transactions. The client-side information 213 is illustrated in detail in FIG. 3 and described below. Each client shares some of its respective information with the server 201. The server 201 maintains global information 221 about the state of each client's allocated credits. The server-side information 221 is illustrated in detail in FIG. 5 and described below. In a resource constrained situation, the server 201 uses the information from the clients to reallocate the server's resources among the several competing clients.

The following discussion describes in detail the interaction of the client and the server to dynamically allocate resources. First, the client will be described including the information stored on the client and how the client handles messages issuing transaction requests to the server. Next, the server will be described including the information stored on the server and how the server identifies and rectifies a resource constrained situation.

Illustrative Client Operation

FIG. 3 is a functional block diagram generally illustrating an illustrative client 203 configured for use in the network environment of FIG. 2. As above, the client 203 has a connection 204 to the server, and maintains information 213 used in connection with the rebalancing mechanisms of the present invention. The client 203 stores the following information for its connection to the server (1) the current number of outstanding transaction requests (Credits Used), (2) the maximum number of credits or outstanding requests available (Credit Limit), (3) the number of requests that cannot be sent because the Credits Used equals the Credit Limit (Pending Count), and (4) any unset requests (Pending Queue). The Pending Count is also the length of the Pending Queue. The Pending Queue is processed in FIFO order with the possible exception that credit messages are inserted at the head of the Pending Queue. The client-side information 213 may also include additional information, such as status flags or the like.

FIG. 4 is a pseudo-code representation of an illustrative process performed at the client 203 for interacting with the server 201 to achieve dynamic rebalancing of the client's allocated resources. The essential functionality of this pseudo-code could be implemented in software components executing on the client 203.

Initially, when the client 203 connects to the server 201, the two systems negotiate an initial allocation of transaction request credits. Once the negotiation of credits is complete, the client 203 is allowed to send a number of transaction requests up to the negotiated limit. A typical minimum number of credits could be two. One credit could be reserved by the client 203 to handle priority messages. In the case of LWIO one credit may be reserved for INTERRUPT messages which tell the server 201 that the client 203 is going to sleep to wait for outstanding requests to be processed. The server sends a wake-up message so the client can complete its transactions.

As shown in portion 403, when the client 203 receives a new request to perform a transaction, a test is performed to determine if the number of currently used credits is less than the credit limit. If so, the client updates its Credits Used number and issues a transaction message to the server 201. When the client 203 sends the transaction message, the client includes a "hint" about the number of transactions that are pending at the client 203 (the Pending Count). Transactions become pending when the number of transaction requests exceeds the client's Credit Limit. The hints may be sent using an 8 bit field in the transaction message. If there are more than $2^8$ requests pending, the field may be set to 255. As described in conjunction with FIGS. 5 and 6, the server 201 uses the hints to determine how to fairly allocate credits to clients.

In a resource constrained situation, the server may attempt to adjust the number of credits the client has, so it will send a "delta credit" message. The delta credit message contains the change in credits as a plus or minus number relative to what the server has currently allocated for the client to use. In this implementation, deltas are used rather than absolute values to prevent problems on networks where out of order receipt is possible. With this scheme it is possible for a client to use more credits than it is allowed. However, given enough time it will never be left in a state where this is perpetually true. If absolute numbers are used it is possible for a client to continually try to use more credits than it is allocated.

At portion 407, if the client 203 receives a plus delta N credit message it can immediately send N additional requests to the server 201. A credit acknowledge is sent as part of an existing request or as a separate message. If a separate message is used then only N-1 new requests are sent along with the acknowledge message. At portion 409, if a minus delta credit message is received the client 203 waits until enough pending transactions have completed that sending a new request will not cause the new credit limit to be exceeded.

In networks where receive buffers have to be posted before messages can be received by either a client or server, a method has to be devised to flush out posted buffers from the receive queue when a server wants to reduce a clients credits by N. The server can either send N minus one delta messages to the client to allow the client to reclaim buffers out of the receive queue followed by the client sending N minus one credit messages to the server to allow the server to reclaim its buffers from the receive queue. The server would not reply to the N minus one credit messages. In a second method used by LWIO the server sends one minus N credit message to the client followed by the client sending N minus one credit messages to the server to allow the server to reclaim N buffers. The server will reply to each minus one credit message to allow the client to reclaim its buffers from the receive queue. This technique is used by LWIO running on VI networks which requires receive buffers to be posted.

Information Maintained by the Server

FIG. 5 is a functional block diagram generally illustrating a server 201 configured for use in the network environment of FIG. 2. The server 201 is responsible for handling client transaction requests and receives a connection 510 from each client. Each client can have more than one file open on a given connection 510. In this particular implementation, credits are allocated to clients on a per connection basis but may be based on the number of files open or on the number of connections.

The server maintains server-side information 221 about each connection to assist the dynamic rebalancing mechanism of the invention. The server 201 stores the following information for each connection instance "i" (1) the number of outstanding requests from the client (Credits Used ($CU_i$)), (2) the maximum number of credits the client connection is allowed to use (Credit Limit ($CL_i$)), (3) the maximum hint sent by the client for a given credit timeout period (Client Pending Queue Count ($CP_i$)), and (4) the number of files currently open for use by the client connection ($CF_i$). The server 201 may also maintain information about acknowledge flags and the like.

FIG. 6 is a pseudo-code representation of an illustrative process performed at the server 201 for interacting with the client 203 to achieve dynamic rebalancing of the client's allocated resources. The essential functionality of this pseudo-code could be implemented in software components executing on the server 201.

The pseudo-code shown in FIG. 6 is divided into four portions: a new client connection (portion 603), a new client request (portion 605), a credit message (portion 607), and a timer expired (portion 609). First, as mentioned above, when a client connects to the server 201 (at portion 603), the server 201 and client negotiate a minimum number of credits for the client. If the credits are available, the server accepts the connection. Otherwise, the server 201 can reject the connection. It should be noted that if, during the life of a connection, a client exceeds the number of negotiated requests, the server may determine the appropriate reaction. Options include ignoring the new request, terminating the connection between the client and server, or simply processing the excessive requests.

As mentioned above, each time a client issues to the server a transaction request, the client includes a hint (e.g., the client's CP) about how many resources the client desires. Accordingly, at portion 605 the server 201 stores the client's CP in the server-side information 221. The credit rebalancing does not occur unless a client has sent a hint to the server indicating its pending wait queue is greater than one. Once a client request is received with a pending count greater than one, rebalancing may occur at the expiration of a "credit timer." If another hint is received before the credit timer expires and the hint is larger than the currently-stored hint the new one is stored.

In this implementation, the timeout is global to all connections and is used to prevent excessively frequent changes in credit allocations. The timer will continue to be reset until all connections have acknowledged their credit messages. When the credit timeout expires, portion 609 of the process is invoked. The credit timeout is user configurable with the default being 2 seconds.

When the timer expires, the process first determines several things: the total number of existing connections (TC), the total number of files open (TF=sum of the Number of Files Open for all connections), the total credits being requested (TR=sum of the Client Pending Queue Length for all connections), and how many credits are currently in use (TU=Sum of Credits Used for all connections).

Rebalancing credits only occurs if the (TU+TR) is greater than the maximum number of credits available (MC), meaning the server 201 is in a resource constrained condition. The maximum number of credits available may be a function of the networking device being used and/or user specified values. If the server is not currently resource constrained, positive credit messages giving clients $CP_i$ credits will be sent if a client connection has queued transactions ($CP_i>0$) indicating it needs more credits. Credit messages might not be sent to connections that have not acknowledged their last credit message.

If (TU+TR) is greater than MC, then the new number of credits for each connection is computed. In this implementation, either of two polices are used for the rebalancing, one based on files or one based on connections. The choice depends on whether the server is configured to be fair to connections or files. If the policy is based on files, then the new credit limit of a connection is computed as $NCL_i=MC*(CF_i/TF)$ where "NCL" is New Client Limit. If the policy is based on connections, then the new target is $NCL_i=MC/TC$. Priority can be introduced by assigning priority to each file ($FPRI_{i,j}$ in the rage of 1 to 32) or connection ($CPRI_i$ in the rage of 1 to 32). Index "i,j" is connection "i" file "j." The larger the value, the higher the priority.

Weighting using file priority could be used to give connections with higher priority files more credits as follows;

$$NCL_i = MC \frac{\sum_j FPRI_{i,j}}{\sum_{i,j} FPRI_{i,j}}.$$

Weighting using connection priority could be used to give connection with higher priority more credits as follows;

$$NCL_i = MC \frac{CPRI_i}{\sum_i CPRI_i}.$$

If $CL_i$ for a particular connection is greater than $NCL_i$ (meaning that the client is using more than its fair share of credits) and (TU+TR)>MC then that particular client will get a negative credit delta message to release $N=(CL_i-NCL_i)$ credits. The server can send a single "minus N" delta credit message or N "minus one" delta credit messages. How the client acknowledges the message is detailed in the client section.

If the server is rebalancing credits and (($CL_i$*Completion Factor)$-CU_i$)>0 (meaning that the client is not using all its credits) then the client will be sent a negative credit delta message to release $N=(CL_i-CU_i)$ credits. The server can send a single "minus N" delta credit message or N "minus one" delta credit messages. How the client acknowledges the message is detailed in the client section. The completion factor is used to control how many credits are reclaimed even if not used. This is intended to prevent clients that are in transition from having their credits taken prematurely.

If $CL_i$ for a connection is less than $NCL_i$ and $CP_i$ is greater than 0 (meaning that the client has fewer than its fair share) a positive delta credit message will be sent to increase the client's credits by $N=\min(CP_i, NCL_i-CL_i, MC-TU)$. The number of credits used (TU) is then increased by N, and the number of credits being requested (TR) is reduced by N. How the client acknowledges the message is detailed above in the client section.

In order to prevent a situation where a client connection request is rejected due to all credits being used, a certain number of credits can be reserved for new connections. When a new connection is made the credit timer is set to allow redistribution of credits in a credit constrained environment. The number of reserved credits is configurable. When the server receives a credit message from the client it may respond with an acknowledgement.

In this manner, a server in a network environment can dynamically reallocate or rebalance its resources to fairly share those resources among each of a plurality of clients. As has been described, the invention enables a mechanism that grants as many resources to each requesting client as that client needs in a non-resource constrained situation, but rebalances the resources so that each client has its own fair share if the server's resources become constrained.

The above specification, examples and data provide a complete description of the concepts and illustrative implementations of the invention. Since many embodiments of the invention can be made without departing from the spirit and scope of the invention, the invention resides in the claims hereinafter appended.

We claim:

1. A computer program product embodied on a computer-readable storage medium and comprising code stored on the computer-readable storage medium, the code such that, when executed by a processor, causes a computing device to perform the following:

receiving information from a client computing device at a server component on a server computing device, the server computing device configured for dynamic allocation of buffer memory on the server, the buffer memory on the server to be allocated to clients for file system transactions, wherein the information indicates the client needs additional resources to perform a transaction and the information received from the client includes a number of transactions that are currently pending on the client but have not been processed that exceed a maximum number of transactions available limit that was previously negotiated;

determining by the server component if allocating to the client the additional buffer memory on the server puts the server component in a resource constrained situation, wherein the server component is determined to be in a resource constrained situation by comparing a total number of transactions currently in use for all connections to the server and a total number of transactions that are currently pending on the clients for all connections to the server with a maximum number of transactions available on the server;

in response to determining that allocating to the client the additional resources puts the server component in the resource constrained situation:

determining resources currently allocated to a plurality of existing clients; wherein the server component stores server-side information related to each client connection with each of the clients, the server storing server-side information for each connection, the server-side information including:

a current number of outstanding transaction requests from the client;

the maximum number of transactions available limit for the client;

the number of transactions that are currently pending on the client that exceed the maximum number of transactions available limit for the client, wherein the maximum number of transactions available limit for the client is initially determined when each of the clients connects to the server at which point a negotiation is performed between the client and the server to establish the maximum number of transactions; wherein the maximum number of transactions specifies a number of transaction requests to be accepted by the server from the client;

issuing rebalancing messages configured for distributed file systems to any affected clients to either reduce or increase their maximum transaction available limit, wherein the rebalancing messages to the affected clients comprise deltas, each delta specifying a change in the maximum number of transactions available to the corresponding affected client; wherein the delta is a positive change or a negative change.

2. The computer-readable medium of claim 1, wherein the server component executes on a server in a network environment.

3. The computer-readable medium of claim 1, wherein the server component is further configured to allocate the client the additional resources needed if the server determines that such allocation does not create the resource constrained situation.

4. The computer-readable medium of claim 1, wherein the clients and the server component communicate using a light weight input/output protocol.

5. The computer-readable medium of claim 1, wherein each delta is based on a determination of a credit limit for the client scaled by a completion factor, wherein the completion factor is used to control how many credits are reclaimed even if not used.

6. The computer-readable medium of claim 5, wherein the delta of each rebalancing message is a one credit delta.

7. The computer-readable medium of claim 6, wherein the delta of each rebalancing message comprises a plurality of credits.

8. The computer-readable medium of claim 1, wherein the rebalance of the resources is performed based on a distribution of the resources among the plurality of clients, wherein the distribution allocates server buffer memory from an existing client to a new client if the existing client is not using the server buffer memory.

9. The computer-readable medium of claim 8, wherein the distribution of the resources is based on a number of clients connected to the server component.

10. The computer-readable medium of claim 9, wherein at least one client connection is assigned a higher priority than connections of other clients.

11. The computer-readable medium of claim 8, wherein the distribution of the resources is based on a number of open files associated with each client connected to the server component.

12. The computer-readable medium of claim 11, wherein at least one open file is assigned a higher priority than other open files.

13. A computer program product embodied on a computer-readable storage medium and comprising code that, when executed, causes a computing device to perform the following:

a plurality of data stores, each data store being associated with a different client connection to a server computing device, wherein the server computing device is configured for dynamic allocation of buffer memory on the server, each data store including:

a credits used field that identifies a number of resource credits currently in use by a client computing device corresponding to the data store;

a credit limit field that identifies a number or resources available to the client corresponding to the data store;

a pending count field that identifies a number of transactions that are pending on the client due to an unavailability of sufficient resources to handle the transactions; and an open files field that identifies a number of files that are currently in use by the client;

receiving a transaction request message on the server computing device from the client; wherein the transaction request message received from the client includes the number of transactions that are pending on the client due to an unavailability of sufficient resources to handle the transactions that was previously negotiated; wherein the transactions that are pending on the client have not been sent to the server, wherein the number of resources available to the client that are stored in the credit limit field is a maximum number of transactions available to the client that is initially determined when the client connects to the server at which point a negotiation is performed between the client and the server to establish the maximum number of transactions; and wherein the server rebalances resources when the transaction request places the server in a resource constrained situation as determined in part by a number of transactions that are pending on the clients; and sending rebalancing messages by a Light Weight Input/Output (LWIO) protocol used for distributed file systems to any affected clients to either reduce or increase their maximum transaction available limit.

14. The computer-readable medium of claim 13, wherein the data store further comprises a flag field that identifies whether the corresponding client has acknowledged a resource-related message.

15. The computer-readable medium of claim 13, wherein a value of the pending count field is provided by the client in connection with a transaction request message.

16. The computer-readable medium of claim 15, wherein a value of the credit limit field is modified based on the value of the pending count field.

17. The computer-readable medium of claim 13, wherein values for the credit limit fields of the plurality of data stores is rebalanced based on a distribution of available resources.

18. A computer program product embodied on a computer-readable storage medium and comprising code that, when executed, causes a computing device to perform the following:

a server component, the server component configured for dynamic allocation of buffer memory on a server computing device, the server component configured to:

receive information from a client that indicates the client needs additional buffer memory on the server to perform a transaction; wherein the information received from the client includes a number of transactions that are that are pending on the client but have not been sent to the server due to an unavailability of sufficient resources to handle; wherein the number of transactions was previously negotiated; and to rebalance resources currently allocated to the client; wherein the server issues messages to any affected clients when the buffer memory on the server is rebalanced by the server; wherein the messages indicate to either reduce or increase each of the affected clients number of transactions, the messages comprising deltas specifying changes in the maximum number of transactions;

wherein the client maintains information about the state of its allocated resources and pending transactions within a data structure, comprising:

a credits used field that identifies a number of resource credits currently in use by a client corresponding to the data structure;

a credit limit field that identifies a number of resources available to the client; wherein the number of resources available to the client is initially determined when the client connects to the server at which point a negotiation is performed between the client and the server to establish the number of resources;

a pending count field that identifies the number of transactions that are pending due to an unavailability of sufficient resources to handle the transactions; and a pending queue field that includes transaction messages corresponding to the transactions that are pending.

19. A computer-implemented method embodied on a computer-readable storage medium, that when executed, causes a server computing device configured for dynamic allocation of buffer memory to perform the following:

computing a total number of client connections, each client connection being associated with a client connected to a server, each client having a credit limit stored on the client and the server that identifies a number of resources that are allocated to the client; wherein the number of resources that are available to the client is initially determined when the client connects to the server at which point a negotiation is performed between the client and the server to the number of resources; wherein the client maintains information about the state of its allocated resources including a current number of outstanding credits used and a maximum number of credits available;

computing a total number of pending requests on each client device that have not been issued to the server that identifies a number of transaction requests that are not being handled due to a limitation on resources;

computing a total number of credits in use; and if the total number of pending requests and the total number of credits in use combined exceeds a total number of available resources, calculating on the server a new credit limit for each of the clients connected to the server;

reallocating the total available resources in accordance with the new credit limits; and issuing messages by a Light Weight Input/Output (LWIO) protocol configured for distributed file systems to affected clients indicating to either reduce or increase their negotiated number of resources.

20. The computer-implemented method of claim 19, wherein the reallocation is based on each client connection receiving a pro rata share of the total available resources.

21. The computer-implemented method of claim 20, wherein the pro rata share of the total available resources is based on the total available resources divided among the total number of client connections.

22. The computer-implemented method of claim 21, wherein the total available resources are divided evenly among the total number of client connections.

23. The computer-implemented method of claim 21, wherein at least one of the client connections is weighted more heavily than another of the client connections.

24. The computer-implemented method of claim 20, wherein the pro rata share for a particular client is based on a proportion of a total number of open files to a number of open files for the particular client.

* * * * *